Figure 1:
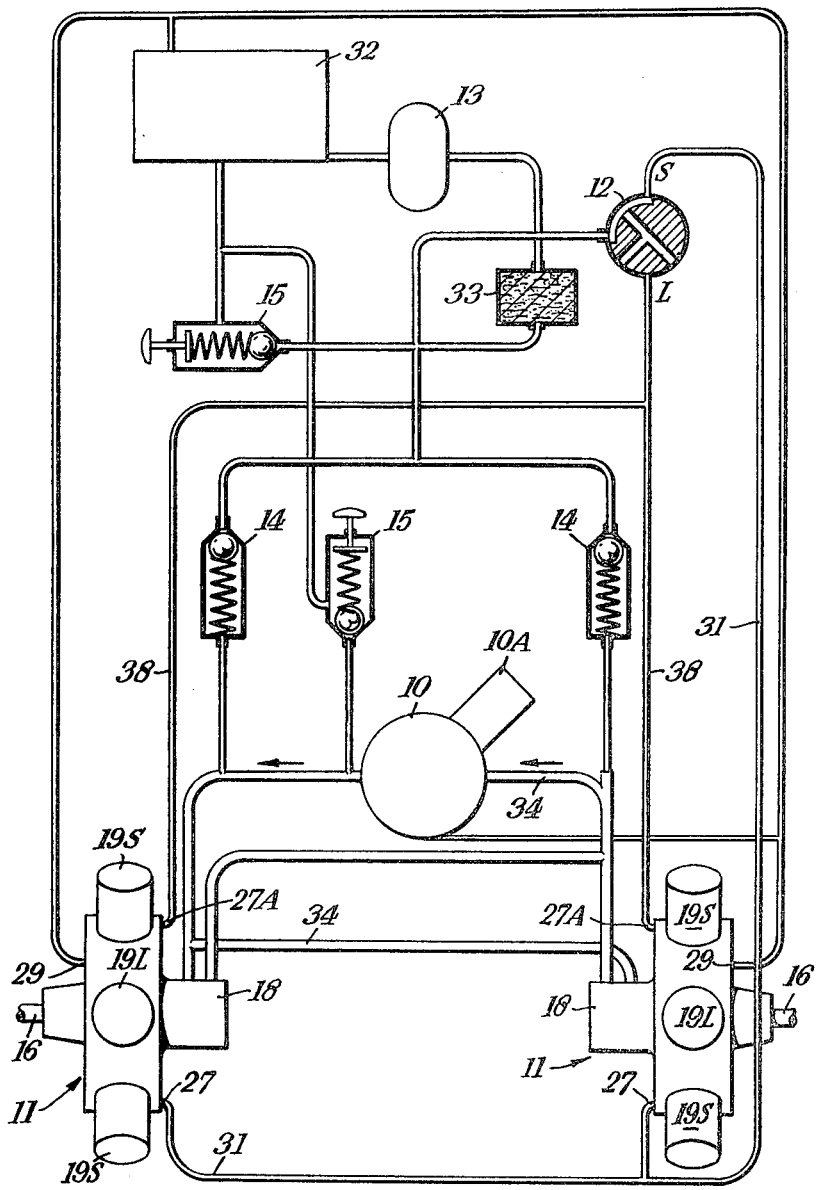

INVENTOR
Ronald H. Wilson

By Watson, Cole, Grindle & Watson
ATTORNEYS

Sept. 21, 1965

R. H. WILSON 3,206,931

HYDRAULIC TRANSMISSION SYSTEMS

Filed May 12, 1964

5 Sheets-Sheet 3

INVENTOR
Ronald H. Wilson

By Watson, Cole, Grindle & Watson
ATTORNEYS

INVENTOR
Ronald H. Wilson
By Watson, Cole, Grindle & Watson
ATTORNEYS

United States Patent Office 3,206,931
Patented Sept. 21, 1965

3,206,931
HYDRAULIC TRANSMISSION SYSTEMS
Ronald Holdsworth Wilson, 59 Victoria Cresent,
Horsforth, near Leeds, England
Filed May 12, 1964, Ser. No. 366,817
Claims priority, application Great Britain, May 20, 1963,
19,999/63
10 Claims. (Cl. 60—53)

This invention relates to closed hydraulic transmission systems, which may be used for driving a vehicle or for industrial applications, of the type comprising a pump, and a motor driven by the hydraulic pump and having a number of cylinders which are connected in turn by a distributor valve to pressure and exhaust and which drive a common output shaft. In the case of a vehicle transmission, two such motors may be provided which drive a pair of opposite wheels and are supplied by a common pump, alternatively four motors can be provided in the case of a four wheel drive. If desired, the road wheels can be fixed directly to the motor shafts.

It is undesirable to vary the speed of a hydraulic motor over too wide a range by variation of the stroke of the pump because hydraulic pumps only operate efficiently over a relatively narrow range. With a view to overcoming this disadvantage, the invention provides a hydraulic motor for use in such a system having two sets of cylinders, one of larger and the other of smaller capacity, arranged to drive a common output shaft, a distributor valve for connecting the cylinders in turn to pressure and exhaust and a valve mechanism whereby either or both sets of cylinders can be placed in operation.

Thus, in the case in which the cylinders are disposed radially in relation to the output shaft of the motor, we may provide a set of large and a set of small cylinders which are either paired axially, i.e. with a large cylinder in tandem with a small cylinder, or arranged alternately around the output shaft. Three phases of operation or ratios are thus provided in a vehicle transmission, viz:

(1) Low torque—High speed—small cylinders only driving (top gear).
(2) Medium torque—Medium speed—large cylinders only driving (middle gear).
(3) High torque—Low speed—all cylinders driving (bottom gear).

Preferably the system includes valving which will not only provide the above phase changes but also enable the pistons which are not being used to remain stationary at the top of their strokes, so that they are not pumping idle oil. It is clear for instance that if, in "top gear" when the small cylinders only are working and the large cylinders were idly stroking, they would be pumping useless oil at high velocity and thus giving rise to considerable parasitical flow losses.

Figure 2:
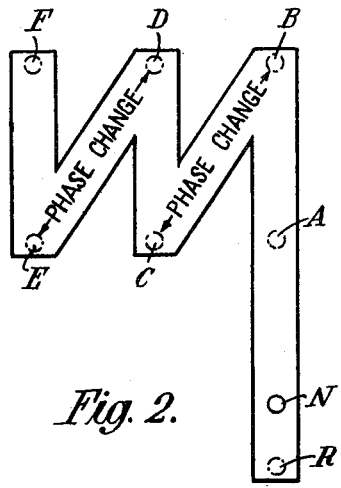
Figure 3A:
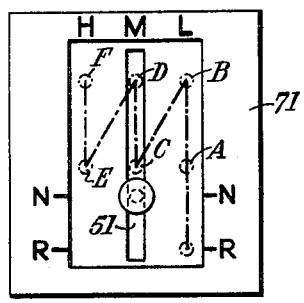
Figure 3:
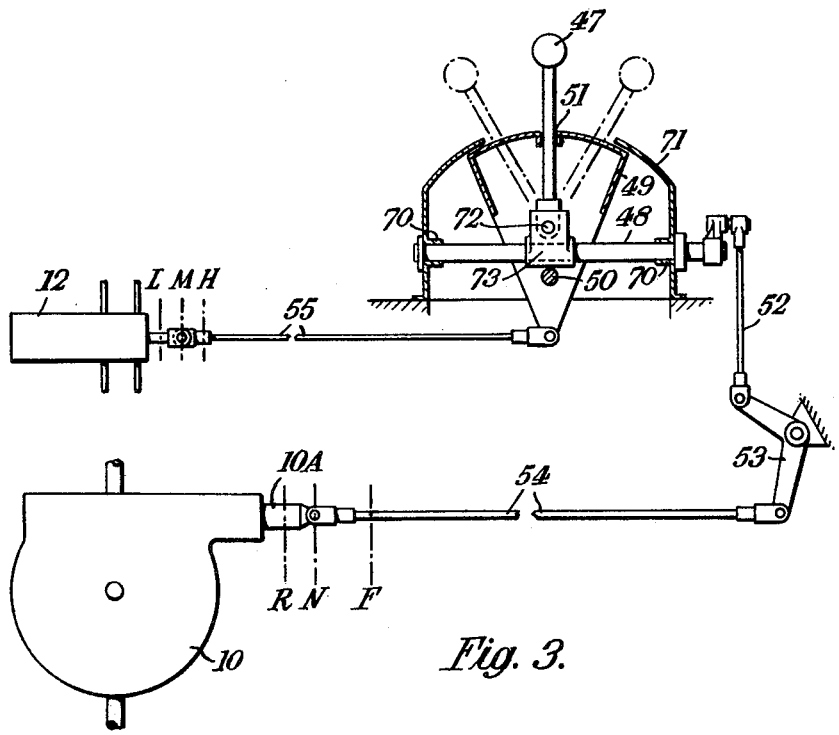
Figure 4:
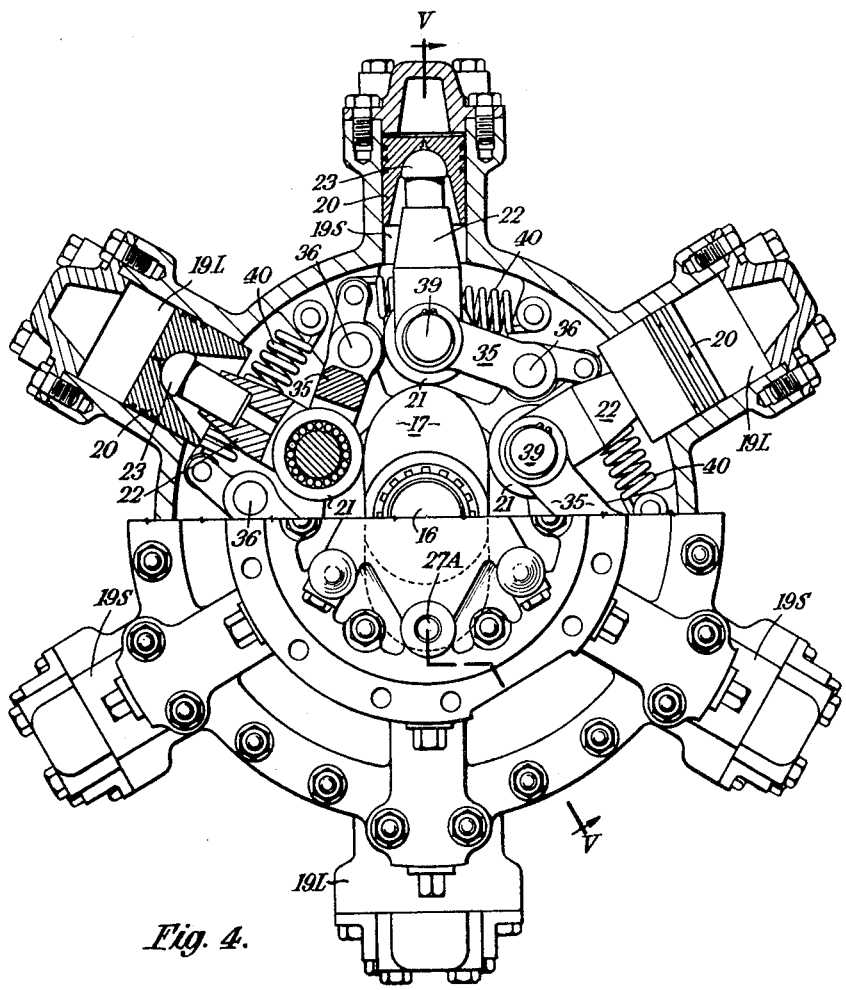
Figure 5:
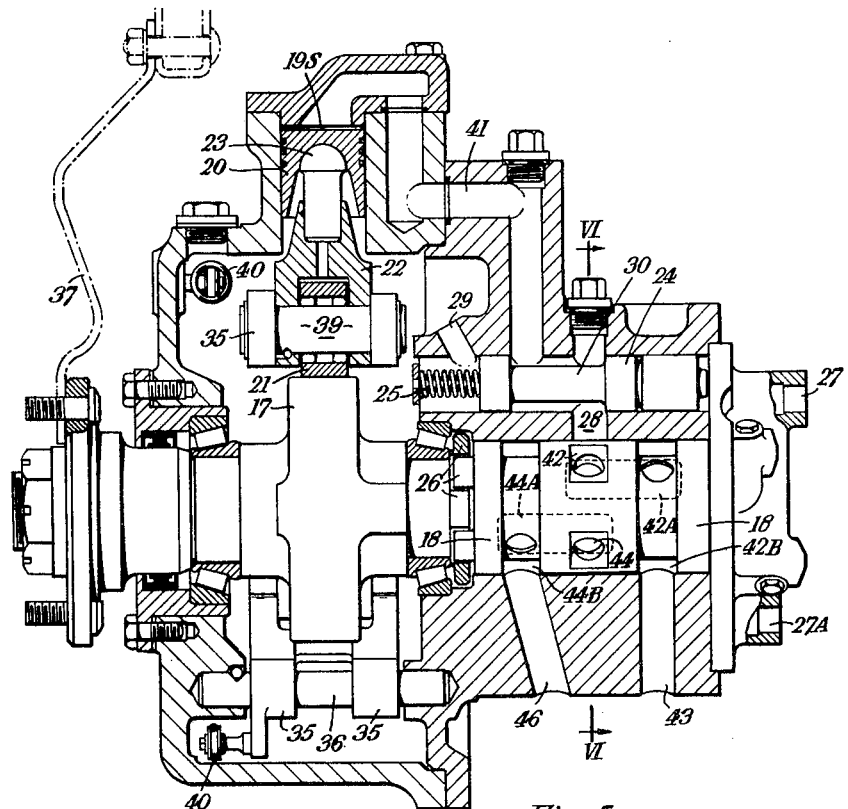
Figure 6:
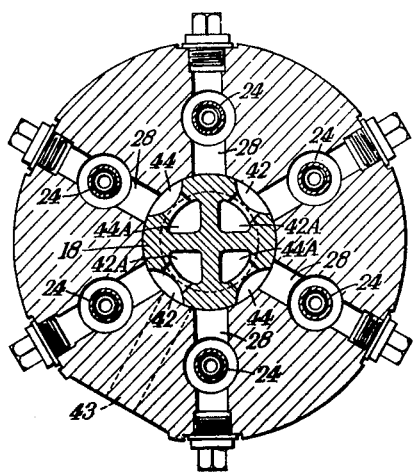
Figure 7:
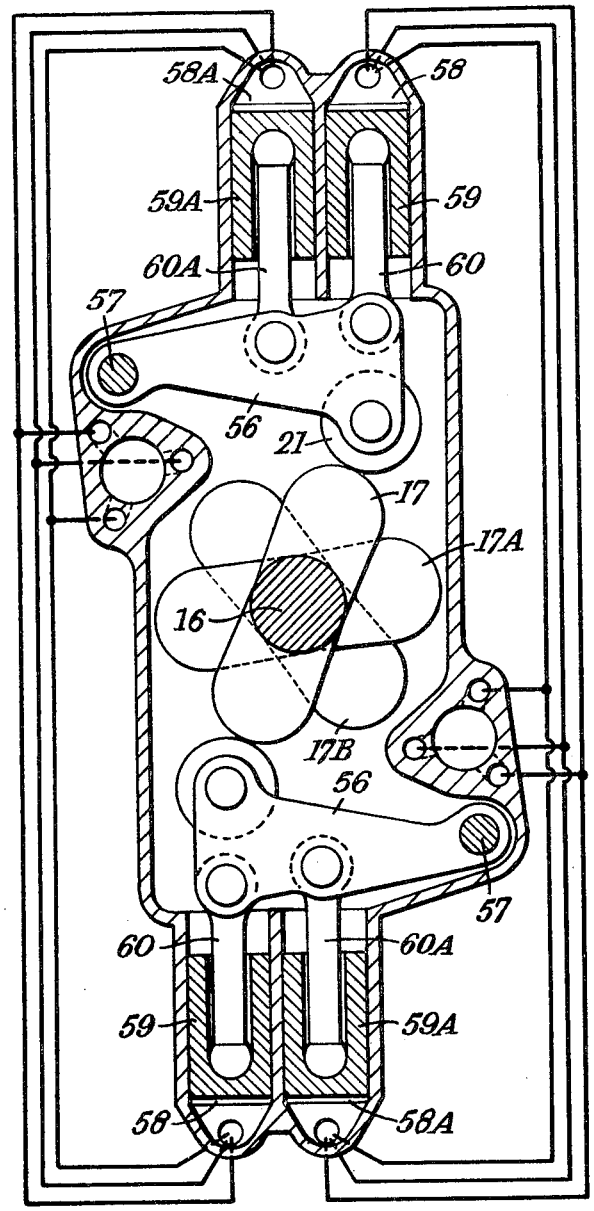

A hydraulic transmission system according to the invention will now be described in detail, by way of example, with reference to the accompanying drawings, in which:

FIG. 1 is a diagrammatic lay out of the system,
FIG. 2 illustrates diagrammatically the gear change system,
FIG. 3 is a diagrammatic side elevation illustrating the gear change system,
FIG. 3A is a corresponding plan view,
FIG. 4 is an end elevation, partly in section, of one of the hydraulic motors,
FIG. 5 is a section on the line V—V in FIG. 4,
FIG. 6 is a section on the line VI—VI in FIG. 5, and
FIG. 7 is a cross section through an alternative form of hydraulic motor.

Like reference numerals designate like parts throughout the figures.

The system includes a variable stroke swash plate pump 10 (FIG. 1), which may be driven by a diesel engine or other suitable prime mover for supplying oil under pressure to hydraulic motors 11 associated with the near and offside wheels, a phase control valve 12, a boost pump 13 for supplying oil at a boost presure of say 50 p.s.i. to the exhaust side of the closed system between the pump 10 and the motors 11, boost valves 14 and relief valve 15.

The boost pump draws oil from a make up tank 32 and feeds the oil through a filter 33 and the boost valves 14 to the main hydraulic circuit 34 between the pump 10 and the motors 11. The phase control valve 12 supplies oil at boost pressure to the motors 11, through control lines 31, 38 to determine which cylinder shall be in operation as later described.

As shown in FIGS. 4–6, each motor 11, which is mounted within a wheel rim 37 indicated in FIG. 5, has an output shaft 16 to which movement is imparted from its cylinders through a two lobe cam 17. The cylinders of each motor are connected in sequence to pressure and exhaust by a pintle valve 18 (FIG. 1) driven by the output shaft 16 through a coupling 26. Each motor has three equally spaced large cylinders 19L and three equally spaced small cylinders 19S. The piston 20 in each cylinder bears against the cam 17 through the agency of a roller 21, mounted in a rocker 22, having a spigot 23 which engages a recess in the piston 20. An arm 35, mounted on a fixed pivot pin 36, is pivoted to a spindle 39 carrying the roller 21 and attached to a spring 40 which urges the piston 20 to its outward or top dead centre position. In order to ensure that the output shaft 16 will be driven at constant torque and constant angular velocity, notwithstanding that the motor is supplied with a constant flow of motive liquid, the profile of the cam 17 is such that the pistons move at constant acceleration over the first 30° rotation of the cam from top dead centre (which corresponds to a quarter of the piston stroke), then move at constant velocity over the next 30° rotation of the cam (which corresponds to half of the piston stroke) and then move at constant deceleration over the next 30° of rotation of the cam.

A duct 41 (FIG. 5) leads to the outer end of each cylinder and communicates under control of a valve 24, as later described, with a port 28 controlled by the pintle valve 18. The valve 18 has a pair of inlet ports 42 (FIG. 6) which periodically connect the ports 28 through channels 42A and an annular port 42B to an inlet 43, and exhaust ports 44, which periodically connect the ports 28 through channels 44A and an annular port 44B to an outlet 46.

A control valve 24 (FIG. 5) is provided for each cylinder. The three control valves associated with the small cylinders 19S are controlled in unison by application of boost pressure to an inlet port 27 and the three control valves associated with the large cylinders 19L are controlled in unison by application of boost pressure to an inlet port 27A. Each valve 24 is loaded by a spring 25.

When the valve 24 occupies the position shown in FIG. 5, oil at pump pressure can flow from the port 28, via the waisted portion 30 of the valve, and through the duct 41 to the top of the associated cylinder so that the cylinder is in operation. When, however, the phase control valve 12 (FIG. 1) is shifted to apply boost pressure to the inlet 27 or 27A as the case may be, the valve 24 moves to the left against the spring 25, so shutting off the inlet port 28 and connecting the cylinder to an exhaust outlet 29. The cylinder is then placed out of operation and the spring 40 (FIG. 4) "parks" the piston at the top of its stroke, where it remains stationary until the next phase change.

The pistons of all cylinders have, of course, the same stroke but the cross sectional areas of the large cylinders are so related to the cross sectional areas of the small cylinders that the proportional increase in flow in changing from phase 1 to phase 2 is the same as that in changing from phase 2 to phase 3. This requires that the ratio $$\frac{\text{area of large cylinder}}{\text{area of small cylinder}}$$

should fulfill the following relation $x^2 = 1 + x$ or $x1.618$, which involves a proportional change in flow of approximately 62% at each phase change.

The system is controlled by a single lever 47, FIG. 3, which is movable as indicated diagrammatically in FIG. 2.

As shown in FIGS. 3 and 3A, the lever 47 is pivoted by a pin 72 to a bracket 73 fixed to a shaft 48, which is rotatably mounted in bearings 70 in a housing 71. A quadrant 49 is pivoted to the housing 71 on a pin 50 and is provided with a slot 51 to accommodate the lever 47. Fore and aft movement of the lever 47 in the slot 51 rotates the shaft 48 and, through a link 52, a bell crank 53 and a link 54 adjusts the swash plate control member 10A of the pump between positions, N (neutral), R (reverse) and F (forward). Lateral movement of the lever 47 rocks the quadrant 49 about a pin 50 and, through a link 55, shifts the phase control valve 12 to its alternative positions, L (low gear), M (medium gear) and H (high gear).

When the lever 47 is in the position N (FIG. 2) the swash plate of the pump is set for zero delivery. Movement of the lever to R causes the vehicle to be driven in reverse at slow speed. Movement to A causes the vehicle to be driven forward at a slow speed but with high tractive effort (bottom gear) the phase change-valve 12 being in position L and both sets of cylinders being in operation. Movement in the range A–B gradually increases the swash plate angle, provides more flow over the range of efficient operation of the pump and gradually increases the speed of the vehicle. As the lever 47 is moved from B to C, the phase change valve 12 is moved to position M and the small cylinders are thrown out of operation to increase the speed of the motors and the swash plate angle is reduced to provide a corresponding decrease in flow from the engine. Movement of the lever in the range C–D gives a variation in vehicle speed in second gear by gradually increasing the swash plate angle to provide more flow over the range of efficient operation, as before. Movement from D to E engages top gear, by moving the phase change valve 12 to position H and rendering the small cylinders operative in place of the large cylinders. Movement over the range E–F gives a variation in vehicle speed in top gear by again increasing the swash plate angle, as before.

Some oil is expelled from the closed system 34 on each upward gear change and must be returned on the downward gear change. This oil will be returned by the boost pump 13 or it may be accelerated by the provision in the system of a small hydraulic accumulator or auxiliary boost pump.

FIG. 7 shows diagrammatically an alternative form of motor in which three two lobe cams 17, 17A, 17B are provided on the output shaft 16 at axially spaced positions and displaced at 60° from one another. Each cam is associated with two pairs of cylinders, one at each side of the cam, each pair of cylinders being operative on a single roller 21 which applies thrust to the cam. Each roller 21 is mounted on a lever 56 which can turn on a pivot pin 57. One cylinder 58 of each pair contains a piston 59 which operates on the lever 56 through a rod 60. The other cylinder 58A contains a piston 59A which acts on the lever 56 at a point nearer the pivot pin 57 through a rod 60A. Since the pistons 59 execute a longer stroke than the pistons 59A, the capacity of the cylinders 58 is larger than that of the cylinders 58A.

Distribution of oil to the cylinders is controlled as before by suitable valving. When both sets of cylinders 58, 58A are in operation, the motor is driven in low gear, at maximum torque and minimum speed. When the cylinders 58 only are in operation, the motor is driven in middle gear and at medium torque and speed. When the cylinders 58A only are in operation, the motor is driven in high gear, at minimum torque and at maximum speed.

If desired springs may be provided for urging the pistons of inoperative cylinders to the outer ends of their cylinders.

What I claim as my invention and desire to secure by Letters Patent is:

1. A hydraulic motor, for use in a closed hydraulic transmission system of the type described, comprising two sets of fixed cylinders, one set of larger and the other set of smaller capacity, each of said cylinders accommodating a piston arranged to drive a two-lobe cam mounted on a common rotary output shaft which extends at right angles to the cylinder axes, a distributor valve connecting said cylinders in turn to pressure and exhaust, and valve mechanism whereby either or both sets of cylinders can be placed in operation.

2. A motor as claimed in claim 1, in which the larger and smaller cylinders are disposed radially in relation to the output shaft and are arranged alternately around the output shaft.

3. A motor as claimed in claim 1, which has three larger and three smaller cylinders and in which the cam is so shaped that the output shaft is driven at substantially constant torque and constant angular velocity.

4. A motor as claimed in claim 1 which includes for each cylinder, a control valve which is movable to alternative positions, in one of which it connects the cylinder to the distributor valve and in the other of which it connects the cylinder to exhaust.

5. A motor as claimed in claim 1, in which the distributor valve is a pintle valve aligned with the output shaft.

6. A motor as claimed in claim 1, which includes springs for urging the pistons to the ends of the cylinders remote from the output shaft.

7. A hydraulic motor, for use in a closed hydraulic transmission system of the type described, comprising two sets of fixed cylinders, one set of larger and the other set of smaller capacity, each of said cylinders accommodating a piston arranged to drive a two-lobe cam mounted on a common rotary output shaft which extends at right angles to the cylinder axes, said cam being so shaped that the output shaft is driven at substantially constant torque and constant angular velocity, a distributor valve connecting the cylinders in turn to pressure and exhaust, and valve mechanism whereby either or both sets of cylinders can be placed in operation.

8. A closed hydraulic transmission system comprising a pump and two hydraulic motors driven by the said pump, each of said motors comprising two sets of fixed cylinders, one set of larger and the other set of smaller capacity, each of said cylinders accommodating a piston arranged to drive a two-lobe cam mounted on a common rotary output shaft which extends at right angles to the cylinder axes, said cam being so shaped that the output shaft is driven at substantially constant torque and constant angular velocity, a distributor valve connecting the cylinders in turn to pressure and exhaust, and valve mechanism whereby either or both sets of cylinders can be placed in operation, said transmission system including a single phase control valve external to the motors which is movable to determine which sets of cylinders of both motors shall be in operation.

9. A transmission system as claimed in claim 8, comprising a mechanism for controlling the output of the pump a single control lever which is operable to adjust both the position of the phase control valve, and therefore the transmission ratio, and also of said mechanism for controlling the output of the pump.

10. A transmission system as claimed in claim 8, comprising a boost pump for supplying oil to the exhaust side of said distributor valve and wherein said valve mechanism includes a shift control valve for each motor, and wherein the phase control valve is operable to apply liquid supplied from the boost pump to both motors to said shift control valves in the motors and thereby select the desired cylinders in operation.

References Cited by the Examiner
UNITED STATES PATENTS

| | | | |
|---|---|---|---|
| 1,229,076 | 6/17 | Hayes | 60—53 |
| 1,906,787 | 5/33 | Cuttat | 91—202 X |
| 2,163,080 | 6/39 | Benedek | 60—97 X |
| 2,697,403 | 12/54 | Benedek | 103—174 |
| 2,979,306 | 4/61 | Maye | 60—53 X |
| 2,984,985 | 5/61 | MacMillin | 60—52 X |
| 3,057,161 | 10/62 | Henke et al. | 60—53 |

EDGAR W. GEOGHEGAN, *Primary Examiner.*